March 21, 1950      M. L. LIBMAN      2,500,953
MAGNETORESISTOR

Filed Sept. 24, 1948      2 Sheets-Sheet 1

Inventor
Max L. Libman

By G. J. Kessenich & J. H. Church
Attorneys

March 21, 1950 M. L. LIBMAN 2,500,953
MAGNETORESISTOR
Filed Sept. 24, 1948 2 Sheets-Sheet 2
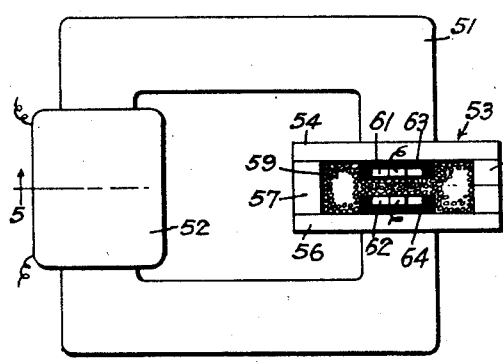
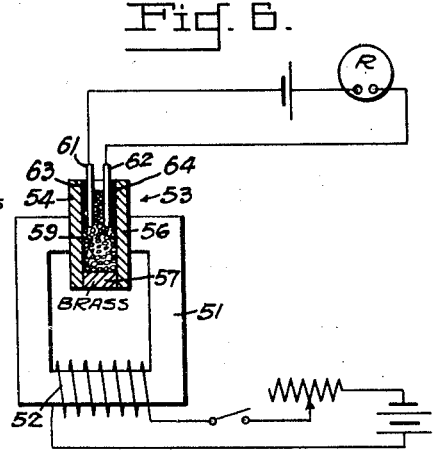
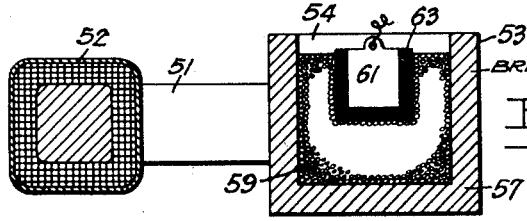
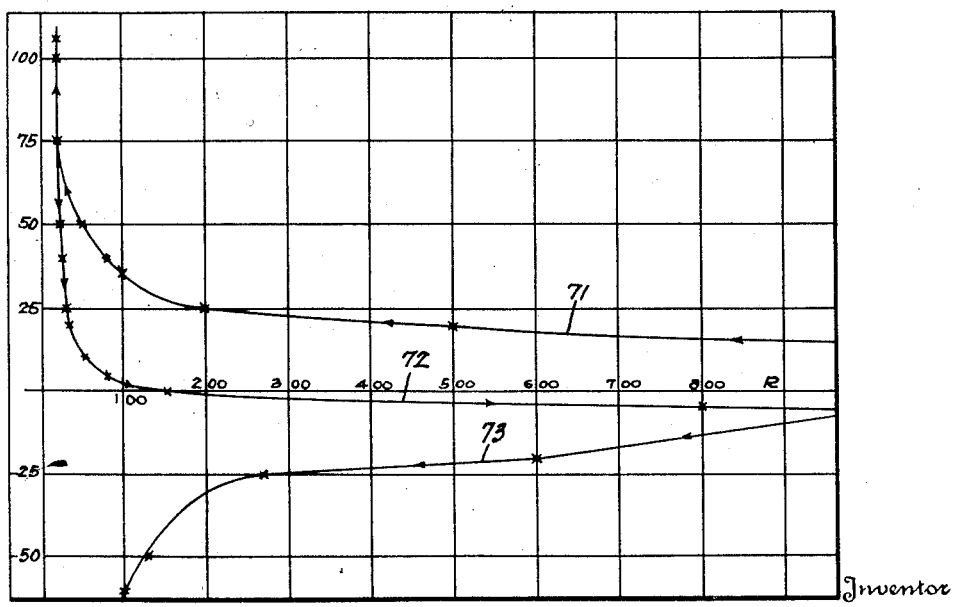
Inventor
Max L. Libman
By G. J. Kessenich J. H. Church
Attorneys Patented Mar. 21, 1950

2,500,953

UNITED STATES PATENT OFFICE 2,500,953

MAGNETORESISTOR

Max L. Libman, Falls Church, Va.

Application September 24, 1948, Serial No. 51,001

1 Claim. (Cl. 201—72)

(Granted under the act of March 3, 1883, as amended April 30, 1928; 370 O. G. 757)

The invention described herein may be manufactured and used by or for the Government for governmental purposes without the payment of any royalty thereon.

This invention relates to a magnetoresistive material, that is, a material whose electrical resistance value is affected by the strength of a magentic field permeating the material. A few materials having such characteristics are known, e. g., bismuth and certain iron-nickel alloys, but the maximum magnitude of the resistance change due to application of a magnetic field in such materials is very slight even with the strongest magnetic field, amounting to only a few percent of the normal resistance, so that careful measuring techniques are required to observe the magnetoresistive change in such materials. The material of my invention, on the other hand, changes its resistance value by large orders of magnitude in the presence of a magnetic field, thus providing a practical resistance element for use in electric circuits, said element having a resistance value directly controllable, under certain conditions, by a magnetic field without the interposition or use of mechanical elements, such as has been necessary in previously known electrically controlled resistance devices.

I have discovered that an intimate mixture of very fine magnetic particles and a non-conducting liquid (which mixture is normally non-conducting or has a resistance of the order of many megohms), when a strong magnetic field is passed through it, becomes a conductor having a resistance value which depends largely on the physical parameters involved, but which may readily be made to be in the order of several thousand ohms, or several hundred ohms, or even less, depending on the quantity of material employed, the size and spacing of the electrodes, etc. This material can be so arranged in a circuit that as the strength of the magnetic field through the material is increased, the resistance is decreased by a very large factor, so that for example, a large change in resistance can be readily obtained by a very small change in energizing voltage. This condition holds true only if a very low value of potential, e. g., in the order of a few volts is applied across the resistance material. At higher values of applied potentials, and under the influence of a magnetic field another effect occurs in my resistance material, namely, a sudden and sharp collapse in resistance value. This latter effect enables the material to be used as a switch controlled directly by a magnetic field.

The specific nature of the invention as well as other objects and advantages thereof will clearly appear from a description of preferred embodiment as shown in the accompanying drawings in which:

Figure 4 is a plan view of physical embodiment employed in testing my invention.

Figure 5 is a sectional view taken on line 5—5 of Figure 4.

Figure 6 is a schematic diagram showing a circuit arrangement used with the apparatus of Figure 4, and Figure 7 is a graph of data taken with the circuit arrangement of Figure 6.

Figure 1:
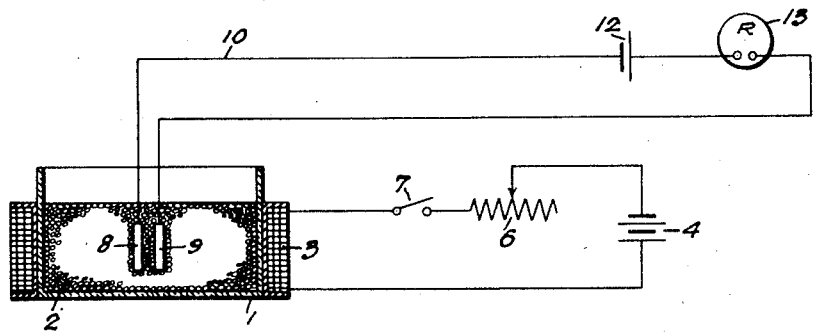
Figure 1 is a schematic diagram showing the principle of my invention.

Referring to Figure 1, a vessel which contains the magnetoresistive material 2, which may by way of example be an intimate mixture of 10% by weight of kerosene and 90% of finely divided paramagnetic materials such as commercially available soft iron dust sold by General Aniline and Film Company, New York, as "Carbonyl Iron Powders" of which any of the grades from 3–20 microns average size has proved satisfactory, and particularly Carbonyl "E" which is 8 microns average size. While the above-described material is particularly satisfactory, any finely divided iron will do and I do not intend to limit this description to carbonyl iron, likewise any non-conducting liquid such as oil will also serve instead of kerosene. Conductor 1 is surrounded by a coil or winding 3, which is supplied by a suitable D. C. voltage source schematically represented by battery 4, controlled by variable resistance 6 and switch 7. This enables a magnetic field of controllable intensity to be passed through the magnetoresistive material. Immersed in the mixture 2 are two electrodes 8 and 9, connected by leads 10 to an external circuit represented, by way of example by a 1.5 volt battery 12 and an ammeter or an ohmmeter 13. With the switch 7 open, the resistance between electrodes 8 and 9 will be very high—in the order of many megohms, so that for most purposes this may be considered to be an open circuit. When switch 7 is closed and a magnetic field passed through 2 the resistance between 8 and 9 (or the current passed between 8 and 9 from battery 12) will be found to decrease until, as a fairly strong field (in the order of 1000 lines per inch) is built up, the resistance (e. g., with an electrode spacing of 1/16 inch and an area of 1/4 square inch) will be found to be in the order of several thousand ohms, and if the field strength is doubled or halved, the resistance will increase and decrease respectively by similar orders of magnitude. The actual resistance for a given setup will vary so widely with changes in the physical parameter and conditions that it is not practicable to state the resistance values more closely, but in practice it is easy to attain any desired resistance range or value from substantially infinity down to a few ohms. It is to be noted that this holds true only for low applied potentials and currents between 8 and 9; if a potential in the order of 50 volts or higher can be applied while the field is on, the resistance will abruptly drop from several thousand ohms to a few ohms and will remain at the low value regardless of subsequent changes in field strength or even if this field is totally removed, until the container is tapped or the particles otherwise shaken up or distributed. This effect, similar to the action of the coherer which was originally used as a detector in early radio communication, enables the device to be used in a suitable circuit as a magnetically controlled switch. The original coherer, of the type employed by Marconi and other early workers in the radio field did not employ and was not known to be affected by a magnetic field.

At low voltage or current values between 8 and 9, the resistance is controllable directly and in reproducible fashion by variation of the applied magnetic field, other factors being held constant, and in this range, my magnetic resistor can be employed in suitable circuits, e. g., radio circuits. At higher voltages across 8 and 9, as previously mentioned, my device can be used as a magnetic switch, since application of a magnetic field will cause a breakdown of resistance between 8 and 9.

Figure 2:
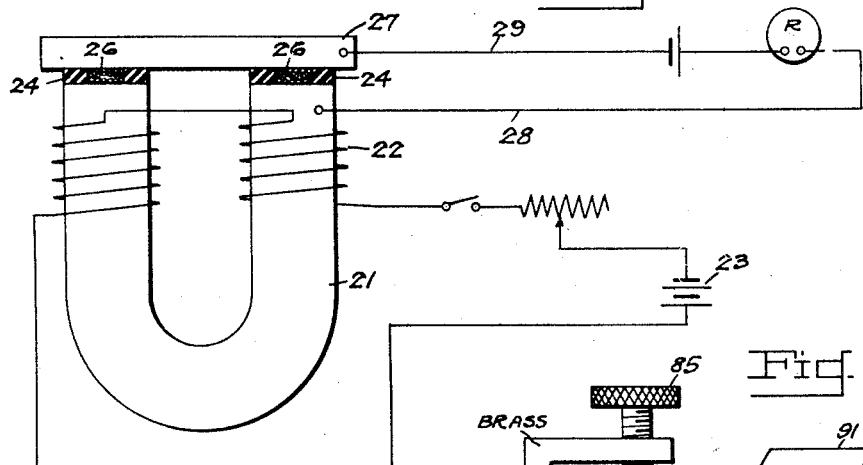
Figure 2 is a schematic representation of one specific embodiment of my invention.

Figure 2 shows another form of my invention wherein the magnet 21 is provided with a winding 22 and supplied from a controllable source 23 as before. At the poles of the magnet are non-magnetic washers 24 each containing a small quantity of magnetoresistive material 26. Across the top of the washers 24 is an armature member 27 to complete the magnetic circuit. Armature 27 is insulated from magnet 21 as by making washers 24 of insulating material. The surface of the poles of magnet 21 may be used as one electrode and the opposed surface of armature 21 as the opposite electrode by connecting leads 28 and 29 to these surfaces respectively, or separate electrodes may be provided adjacent the poles and armature surfaces respectively. Leads 28 and 29 are then connected into any desired utilization circuit as before. It may be noted at this point that the magnetoresistive material 26, once it has been rendered conductive by the application of a magnetic field, is also pressure sensitive, i. e., if washers 24 are made of even moderately soft or deformable material, pressure on armature 27 will affect the resistance of the material 26 between its electrodes. As the pressure is increased, other things being constant, the resistance becomes less. Whether this is due to the increase in flux density as the air gap is decreased slightly, or is primarily a pressure effect per se, I have not ascertained. In any event, the arrangement of Figure 2 can be used as a pressure sensitive device by making the washers 24 of elastic material such as rubber, and conversely, if it is desired that the arrangement be unaffected by pressure, the washers should be sufficiently rigid to resist appreciable deformation as the field strength is increased and the armature attracted more strongly to the magnet poles.

Figure 3:
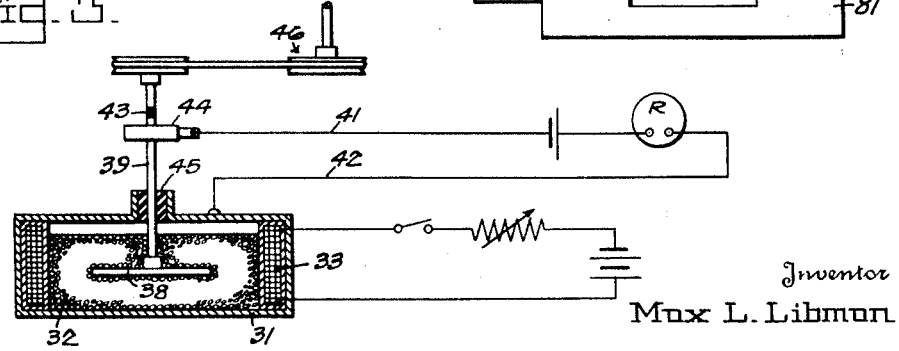
Figure 3 shows another embodiment of my invention employing a constantly movable terminal to minimize the coherer effect.

Figure 3 shows an arrangement for eliminating the coherer effect in the use of the magnetoresistive material. To this end, the terminals which are in contact with the magnetoresistive material are made constantly movable relative to each other. The magnetoresistive material is thus constantly stirred up. The vessel 31, magnetoresistive material 32 and winding 33 are the same as the corresponding elements in Figure 1, but the utilization circuit electrodes are now constituted of magnetoresistive material 32 and disc 38 fixed to a shaft 39 which is insulated at 43 and at bearing 45 and provided with a slipring 44 whereby current can be conducted from lead 41, through slipring 44, shaft 39, disc 38 to the magnetoresistive material 32 thence through vessel 31 and lead 42. Disc 38 is maintained in rotation by any suitable means schematically shown as a pulley arrangement 46. The constant stirring of the material by disc 38 effectively nullifies the coherer effect previously mentioned, which requires the particles to be immobile relative to each other, and which is decohered by even a slight tap on the vessel 31 (or 1 in Figure 1). In practice the above described arrangement is most useful in connection with the control of normally moving machinery from which the relative motion of the electrodes may be readily derived.

Figure 4 shows an arrangement used in taking some test data to show the performance of my magnetoresistive material, with which was obtained the data of Figure 6. A heavy electromagnet 51 has a coil 52 so wound that it required about 100 volts applied to the coil to saturate the magnet under the conditions of the test. Between the poles of the magnet is a container 53 made of two steel sides 54 and 56 separated by a brass U-shaped member 57, and filled with my magnetoresistive material 59. Immersed in the material 59 are two electrodes 61 and 62 insulated at 63 and 64 respectively from the metal sides 54 and 56. The resistance between 61 and 62 was measured by means of a Weston 666 volt-ohmmeter using the R×100 scale. This is significant in some cases because using the R×1 scale of this meter would apply 12 volts across the resistance and this may be sufficiently large to cause the coherer effect to be manifested under some conditions, i. e., the resistance between 61 and 62 will then collapse to a few volts regardless of the field strength in the magnetic circuit. In practice the spacing between 61 and 62 was in the order of 1/8 to 1/16 inch and the exposed area of each electrode about 1/4 square inch. Varying the applied voltage by increments in the same direction from zero volts to 100 volts, varied the resistance along curve 71 as shown, from infinity or some other very high value to a minimum of about 20 ohms at saturation, beyond which it was not possible to increase the flux density with the apparatus used. Decreasing the applied voltage from the saturation value gave the curve 72. It is obvious that these curves follow the hysteresis loop of the magnet material, which was cold rolled steel, and that the resistance at all points was a function of the actual available flux density in the magnetoresistive material 59. Varying the applied voltage in the opposite direction to that originally employed gave the curve 73 which is essentially similar to curve 71 with the voltage reversed.

With the arrangement of Figure 4, if a voltage of about 20 volts is applied to the electrodes 61 and 62 when there is no applied field, i. e., when the flux density is zero and when the resistance of the material 59 is at its highest value, then the material acts as an open circuit. If now a magnetic field is suddenly applied by applying at least 20 volts to the coil 52, the resistance between 61 and 62 will break down suddenly due to the combined coherer effect and magnetoresistive effect, to a very low value in the order of 1 ohm or less, and will subsequently remain at this value even if the field is removed and if the applied voltage is removed, until the fluid is physically disturbed as by tapping or stirring. It will thus be seen that in this form the device acts as a switch, which may be useful in alarm circuits, overload circuits, etc., where one-shot operation with or without manual reset is desired. Other uses of the described properties of my magnetoresistive device will suggest themselves to those skilled in the art.

Figure 8:
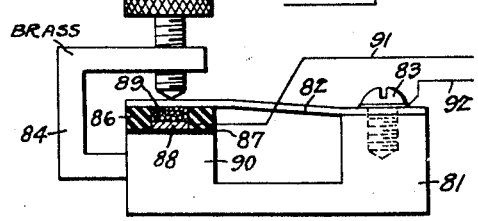
Figure 8 is a schematic diagram of an embodiment of my invention utilizing a permanent magnet.

Figure 8 shows an embodiment of my device employing a permanent magnet 81 provided with a flexible armature 82 fastened to one pole as by a screw 83, or in any other suitable manner. Bracket 84 preferably of brass or other non-magnetic material is provided with an adjusting screw 85 whereby the gap between the free end of armature 82 and the adjacent pole 90 of the magnet 81 may be adjusted, the armature 82 being normally biased away from the pole 90. The face of pole 90 is insulated at 87 and provided with a flexible washer 86 of neoprene or other suitable material. A conducting terminal 88 is disposed on the insulating layer 87 so as to be out of electrical contact with the magnet structure, and is connected to a lead 91 which passes through washer 86 so as to be also insulated from the magnet structure. The space between terminal 88 and armature 82 is filled with my magnetoresistive mixture 89. Lead 92 is connected electrically to the magnet structure.

It will be apparent that as screw 85 is tightened, the air gap will be diminished and the flux density through the magnetoresistive element will be increased, thus decreasing the resistance between leads 91 and 92. As the screw is loosened, the reverse action occurs and the resistance is increased. I thus provide a manually adjustable resistance element which requires no source of energizing current to vary the resistance thereof.

It will be apparent that the above-described embodiments are intended to be only illustrative of some possible uses of my invention, and I do not intend to be limited thereby, as the full scope of my invention will be indicated by the following claim.

I claim:

In combination, a mixture of low conductivity fluid and finely divided ferromagnetic particles, spaced terminal members of electrically conducting material in said mixture, the proportion of particles to fluid being sufficient to conduct a substantial current between said terminal members in the presence of a magnetic field, means for applying electrical potential across said terminal members, means for applying a magnetic field to said mixture, means for varying the intensity of said field, and means for maintaining relative motion between said terminal members without changing the distance of the spacing between them.

MAX L. LIBMAN.

REFERENCES CITED

The following references are of record in the file of this patent:

UNITED STATES PATENTS

| Number | Name | Date |
|---|---|---|
| 716,334 | De Forest et al. | Dec. 16, 1902 |
| 748,306 | Peters | Dec. 29, 1903 |
| 774,922 | Troy | Nov. 15, 1904 |
| 811,654 | Murphy | Feb. 6, 1906 |
| 1,963,496 | Land | June 19, 1934 |
| 2,149,782 | Lucas | Mar. 7, 1939 |
| 2,242,366 | Muller | May 20, 1941 |

FOREIGN PATENTS

| Number | Country | Date |
|---|---|---|
| 22,142 | Great Britain | Feb. 9, 1901 |